(12) United States Patent
Rapp et al.

(10) Patent No.: US 7,944,776 B2
(45) Date of Patent: *May 17, 2011

(54) ENGINE AND TECHNIQUE FOR GENERATING AN ACOUSTIC SIGNAL

(75) Inventors: John Rapp, Manassas, VA (US); Nicholas John Nagurny, Manassas, VA (US); Curry Farrior, Manassas, VA (US); Robert J. Howard, Clifton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 421 days.

This patent is subject to a terminal disclaimer.

(21) Appl. No.: 12/152,269

(22) Filed: May 12, 2008

(65) Prior Publication Data

US 2008/0277195 A1 Nov. 13, 2008

Related U.S. Application Data

(60) Provisional application No. 60/928,897, filed on May 11, 2007.

(51) Int. Cl.
*G10K 15/02* (2006.01)
(52) U.S. Cl. .................................................. 367/145
(58) Field of Classification Search ................... 367/143, 367/145, 147; 181/116, 157; 60/312; 123/193.1
See application file for complete search history.

(56) References Cited

U.S. PATENT DOCUMENTS

| | | | |
|---|---|---|---|
| 1,500,243 A | 7/1924 | Hammond, Jr. | |
| 3,022,852 A | 2/1962 | Pavey, Jr. | |
| 3,048,816 A | 8/1962 | Lubnow | |
| 3,056,104 A | 9/1962 | DeKanski et al. | |
| 3,099,813 A | 7/1963 | Anderson | |
| 3,176,787 A | 4/1965 | Roever | |
| 3,233,694 A | 2/1966 | Roever | |
| 3,245,032 A | 4/1966 | Knott et al. | |
| 3,286,226 A | 11/1966 | Kearsley et al. | |
| 3,368,641 A | 2/1968 | Cholet et al. | |
| 3,380,551 A | 4/1968 | Lang | |
| 3,403,375 A | 9/1968 | Wright, Jr. et al. | |
| 3,458,858 A | 7/1969 | Wright, Jr. | |
| 3,480,101 A | 11/1969 | Barry et al. | |
| 3,509,959 A | 5/1970 | Fitch et al. | |
| 3,537,542 A | 11/1970 | Dubois et al. | |
| 3,545,563 A | 12/1970 | Cholet | |
| 3,563,334 A | 2/1971 | McCarter | |
| 3,588,801 A | 6/1971 | Leonard | |
| 3,592,287 A | 7/1971 | Mollere | |
| 3,620,327 A | 11/1971 | Savit | |
| 3,658,149 A | 4/1972 | Neal et al. | |
| 3,669,213 A | 6/1972 | Mollere | |

(Continued)

*Primary Examiner* — Dan Pihulic
(74) *Attorney, Agent, or Firm* — Mark A. Wurm; Bryan A. Santarelli; Graybeal Jackson LLP

(57) ABSTRACT

An embodiment of a device for generating an acoustic signal in a fluid includes an engine operable to repeat a thermodynamic process to vibrate a membrane of the engine to generate an acoustic signal having more than one period. The thermodynamic process includes heating mass inside a chamber of an engine to generate pressure inside the chamber; in response to generating the pressure, moving in a first direction a portion of a membrane of the engine; removing mass from inside the chamber to decrease the pressure inside the chamber; and in response to decreasing the pressure inside the chamber, moving the membrane portion in a second direction. Because the engine repeats the thermodynamic process, the engine may generate and sustain an acoustic signal for a significant amount of time.

39 Claims, 6 Drawing Sheets

U.S. PATENT DOCUMENTS

| | | | |
|---|---|---|---|
| 3,700,066 A | 10/1972 | Knight et al. | |
| 3,724,374 A | 4/1973 | Somerville et al. | |
| 3,799,094 A | 3/1974 | Hill | |
| 3,800,907 A | 4/1974 | Chelminski | |
| 3,952,832 A | 4/1976 | Elmore et al. | |
| 4,016,952 A | 4/1977 | Reed et al. | |
| 4,073,362 A | 2/1978 | Airhart | |
| 4,100,991 A | 7/1978 | Airhart | |
| 4,153,134 A | 5/1979 | Yang | |
| 4,189,026 A | 2/1980 | Elliot et al. | |
| 4,202,425 A | 5/1980 | Hambrick, Sr. et al. | |
| 4,271,925 A | 6/1981 | Burg | |
| 5,229,977 A | 7/1993 | Owen | |
| 5,339,288 A | 8/1994 | Blier et al. | |
| 5,341,343 A | 8/1994 | Aske | |
| 5,369,625 A | 11/1994 | Gabrielson | |
| 5,748,563 A * | 5/1998 | Hofmann | 367/147 |
| 5,864,517 A | 1/1999 | Hinkey et al. | |
| 6,076,630 A | 6/2000 | Ambs | |
| 6,408,614 B1 * | 6/2002 | Eizenhofer | 367/145 |
| 6,571,906 B2 | 6/2003 | Jones et al. | |
| 6,705,425 B2 | 3/2004 | West | |
| 7,028,807 B2 | 4/2006 | Raleigh et al. | |
| 7,237,524 B2 * | 7/2007 | Pelrine et al. | 123/193.1 |
| 7,240,655 B2 * | 7/2007 | Pelrine et al. | 123/193.1 |
| 7,485,978 B2 * | 2/2009 | Pelrine et al. | 123/195 R |
| 2003/0010565 A1 | 1/2003 | Brooks et al. | |
| 2006/0000214 A1 * | 1/2006 | Pelrine et al. | 60/643 |
| 2006/0039239 A1 | 2/2006 | Cannelli | |
| 2008/0277194 A1 * | 11/2008 | Rapp et al. | 181/116 |
| 2008/0277195 A1 * | 11/2008 | Rapp et al. | 181/157 |
| 2008/0277196 A1 * | 11/2008 | Rapp et al. | 181/157 |

\* cited by examiner

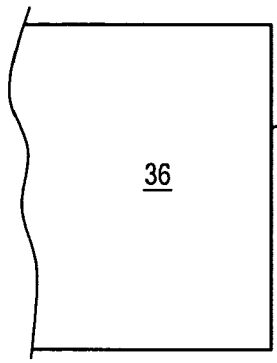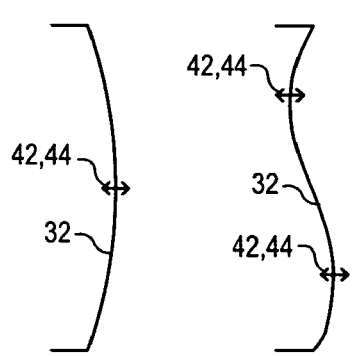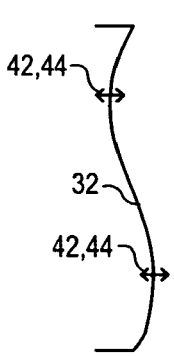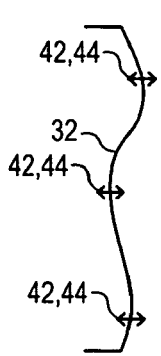
FIG. 4A  FIG. 4B  FIG. 4C  FIG. 4D
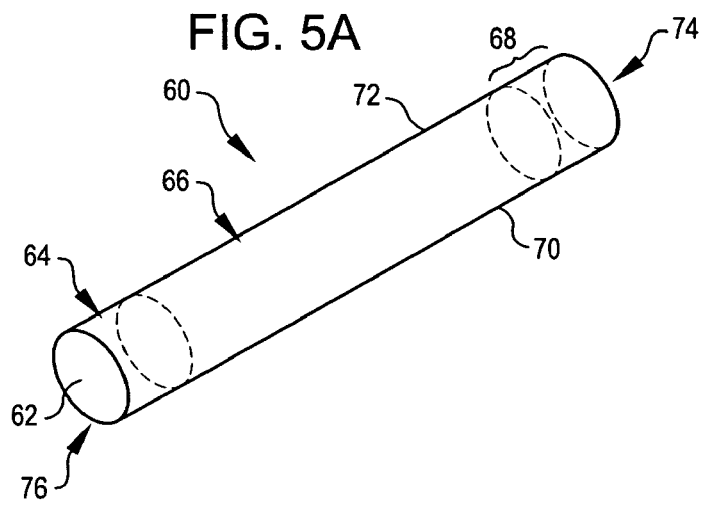
FIG. 5A
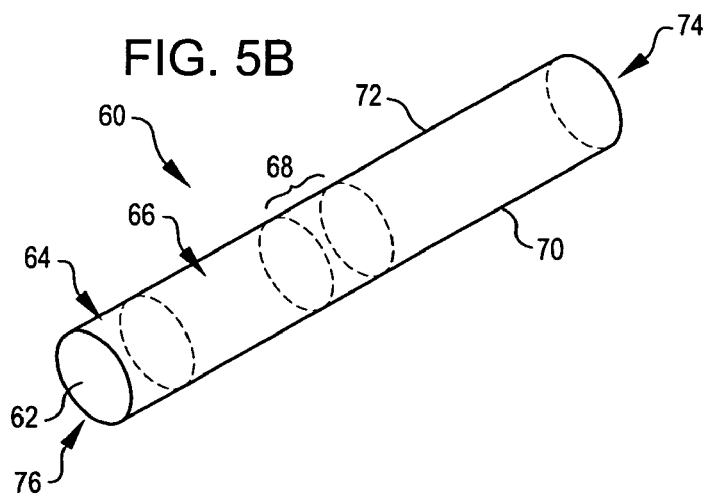
FIG. 5B

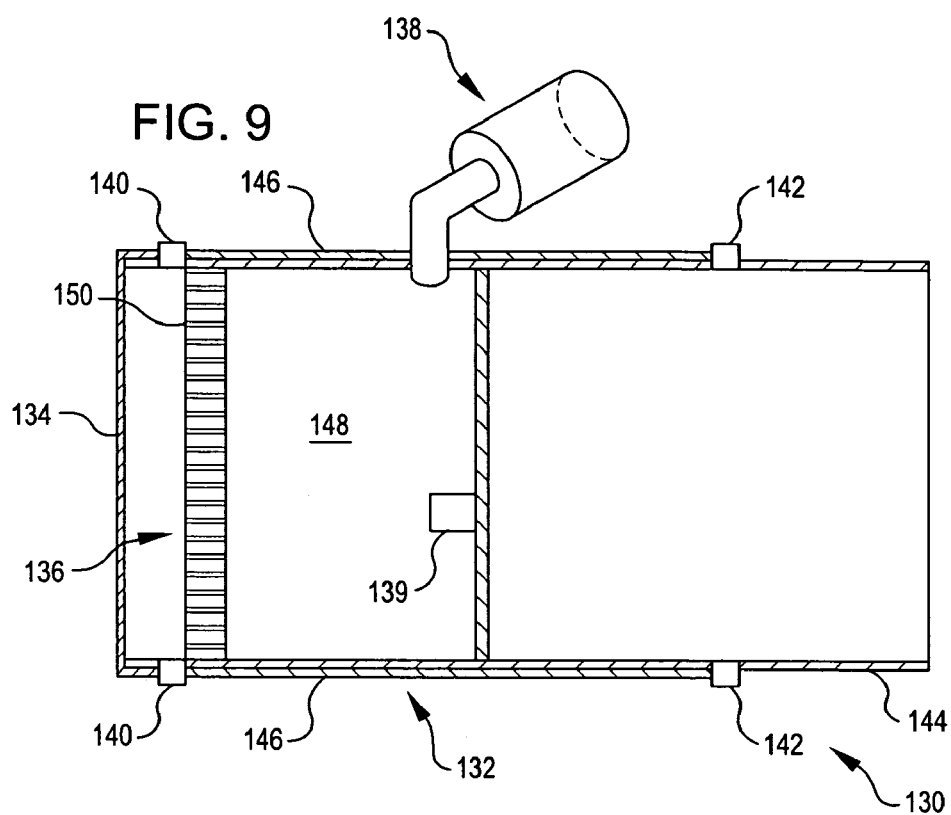
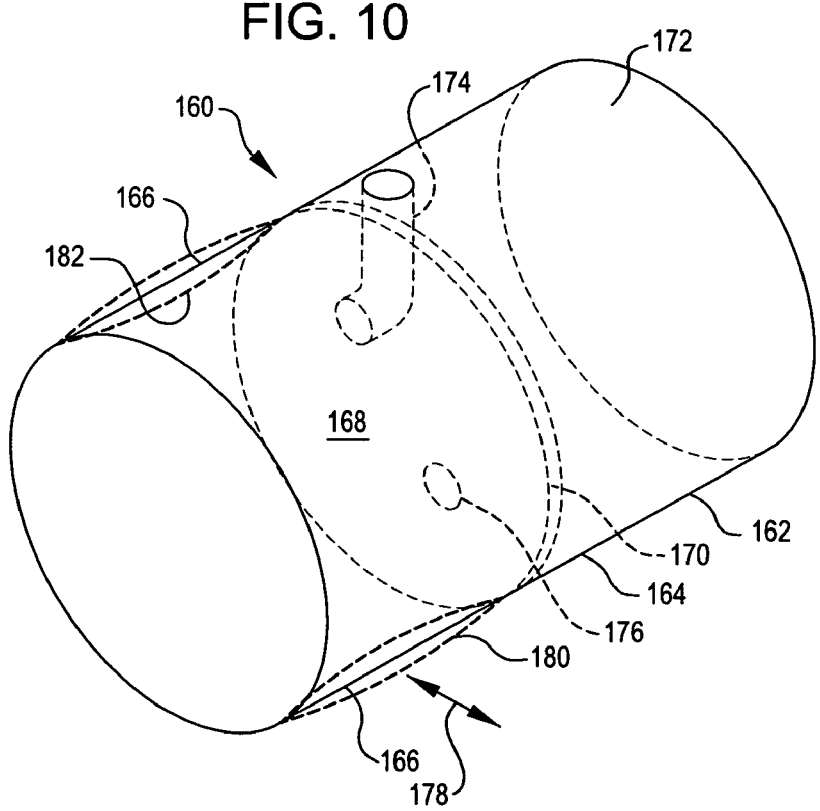

ENGINE AND TECHNIQUE FOR GENERATING AN ACOUSTIC SIGNAL

CROSS REFERENCE TO RELATED APPLICATIONS AND CLAIM OF PRIORITY

This application claims priority from commonly owned U.S. Provisional Patent Application 60/928,897, filed 11 May 2007, and titled Thermo-Acoustic Cycle And Engine, And Related System And Method, which is incorporated by reference; and is related to the following patent applications: U.S. Utility patent application Ser. No. 12/152,282, titled Engine And Technique For Generating An Acoustic Signal, filed 12 May 2008; and U.S. Utility patent application Ser. No. 12/152,274, titled Engine And Technique For Generating An Acoustic Signal, filed 12 May 2008, which are also incorporated by reference.

BACKGROUND

Acoustic signals are used for many different things. In marine environments, acoustic signals are often used to map a region, such as the sea floor, or to navigate, discover, indentify, and/or determine the range of an object such as a ship or submarine. In such marine applications where early discovery and/or identification of a ship or submarine is often desired, a sonar array is usually positioned in the water to monitor the region.

To discover and identify a vessel, the sonar array often includes a component that generates an underwater acoustic signal, and another component that senses the signal after the signal is reflected by an object in the region. For example, the sonar array 10 shown in FIG. 1A includes an explosive charge 12 (here two) to generate the underwater acoustic signal, and a buoy 14 that holds a component (not shown in FIG. 1A) for sensing underwater acoustic signals. To look for a vessel located within the region of the sonar array 10, one of the explosive charges 12 is released from its tether and exploded to generate a signal. The signal propagates through the water and reflects of off objects (not shown in FIG. 1A) in the region. The sensing component then senses the acoustic signal that is reflected back to buoy 14.

Unfortunately, using explosives to generate an underwater acoustic signal for the purpose of early discovery of a ship or submarine may be dangerous and/or ineffective. And the power of the signal may be often hazardous to the wildlife in the region. In addition, because the signal does not persist for a significant period, the signal only provides information about objects in the region at a specific moment in time; the signal does not provide information over a significant period of time. Thus, for example, a submarine traveling through the region is more likely to travel out of detection range between the times that a signal is generated, and consequently avert detection.

To overcome these shortcomings, some sonar arrays include an electro-acoustic transducer, such as a ceramic transducer, to generate acoustic signals under water for a longer period of time. For example, the sonar array 16 shown in FIG. 1B includes such an electro-acoustic transducer 18, and a buoy 20 that holds a component (not shown in FIG. 1B) for sensing underwater acoustic signals. To generate acoustic signals, the transducer 18 is typically powered by a battery (not shown in FIG. 1B).

Unfortunately, using a battery powered transducer to generate an underwater acoustic signal for the purpose of early discovery of a ship or submarine may be ineffective too. The life of the battery may be too short for some applications. Also, many batteries cannot provide enough power to generate a high-amplitude acoustic signal for a significant period. A high-amplitude acoustic signal might be desirable for many different reasons. For example, in a noisy littoral environment, one may need to generate a high-amplitude signal so that the signal can be distinguished in the noisy environment. Thus, in a noisy environment, such as in a littoral region, there may exist significant periods during which the signals generated by the transducer 18 are not effective. In addition, the electro-acoustic transducer may be unable to provide adequate pressure levels due to the physical constraints of the material (e.g., ceramic) from which the transducer is formed and/or the physical constraints in the environment such as the water pressure at substantial depths.

SUMMARY

In an embodiment, a device for generating an acoustic signal in a fluid includes an engine operable to repeat a thermodynamic process to vibrate a membrane of the engine to generate an acoustic signal having more than one period. The thermodynamic process includes heating mass inside a chamber of an engine to generate pressure inside the chamber; in response to generating the pressure, moving in a first direction a portion of a membrane of the engine; removing mass from inside the chamber to decrease the pressure inside the chamber; and in response to decreasing the pressure inside the chamber, moving the membrane portion in a second direction. Because the engine repeats the thermodynamic process, the engine can generate and sustain an acoustic signal for a significant amount of time, which can be longer than a signal generated by battery power or an explosive. In addition, because the heat in the engine's chamber is generated by a chemical reaction, the engine may quickly generate a significant amount of pressure inside the chamber to quickly accelerate the membrane, and thus generate a powerful acoustic signal. Furthermore, various properties of the membrane and/or the thermodynamic process may be modified to tune the acoustic signal to a desired frequency and/or amplitude. Thus, the engine may be effectively used to generate acoustic signals for a number of different purposes, such detecting and ranging objects in a region, and in a number of different marine environments, such as a littoral environment that contains a large amount of noise, or a deep sea environment at high water pressure.

BRIEF DESCRIPTION OF THE DRAWINGS

FIGS. 4A-4D each show a cross-sectional view of a membrane of the engine shown in FIG. 2, according to an embodiment of the invention. FIG. 4A shows the membrane not vibrating, and FIGS. 4B-4D each show the membrane vibrating at a resonant frequency, according to an embodiment of the invention.

FIGS. 5A and 5B each show a perspective view of a device that includes the engine in FIG. 2, according to an embodiment of the invention.

FIG. 9 is a cross-sectional view of an engine, according to another embodiment of the invention.

FIG. 10 is a perspective view of an engine, according to yet another embodiment of the invention.

DETAILED DESCRIPTION

Figure 1A:
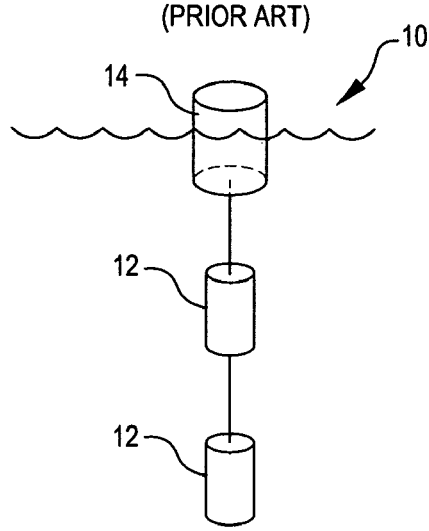
FIGS. 1A and 1B each show an example of a conventional sonar array for generating and detecting under water acoustic signals.
Figure 1B:
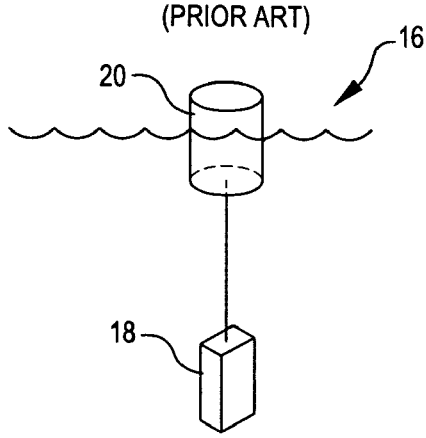
Figure 2:
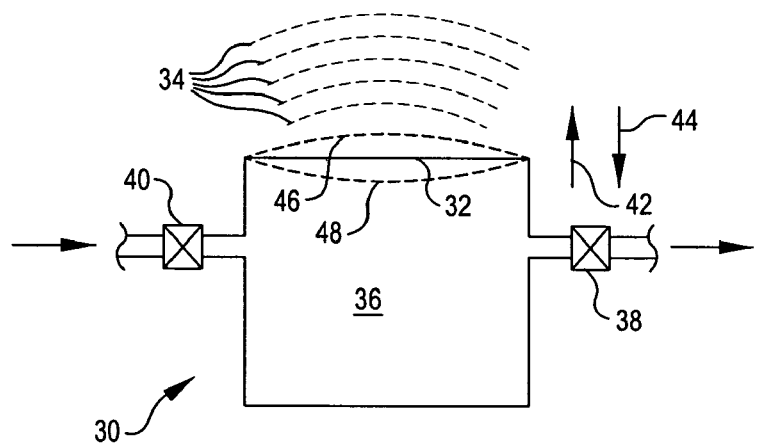
FIG. 2 is a schematic view of an engine, according to an embodiment of the invention.

FIG. 2 is a schematic view of an engine 30, according to an embodiment of the invention. The engine 30 includes a membrane 32 that vibrates to generate an acoustic signal 34, and drives the membrane's vibration via a thermodynamic process, which may proceed when the engine is positioned in any fluid, such as water or air. For example, when the engine 30 is submerged in a body of water such as an ocean or a lake, the engine 30 may generate an underwater acoustic signal that may be used as sonar. In addition, the engine 30 may drive the vibration of the membrane 32 for a significant period, for example 15 minutes or longer, by repeating the thermodynamic process. Thus, the engine 30 may sustain the acoustic signal 34 for a significant period. Furthermore, various properties of the membrane 32 and/or the thermodynamic process may be modified to tune the acoustic signal 34 to a desired frequency and/or amplitude. Thus, the engine 30 may be effectively used to generate acoustic signals for a number of different purposes, such as detecting and ranging objects in a region, and in a number of different marine environments, such as a littoral environment that contains a large amount of noise, or a deep sea environment that exerts a large amount of external water pressure.

The engine 30 includes a chamber 36 inside which reactants (not shown in FIG. 2) are combined to generate heat, and thus pressure, inside the chamber, an exhaust valve 38 to release the pressure inside the chamber, and an intake valve 40 to inject reactants into the chamber 36. The reactants may include sodium and water (as discussed in greater detail in conjunction with FIG. 6), hydrogen and oxygen, or any other elements or compounds that when combined generate heat. The exhaust valve 38 and intake valve 40 are each closed during a portion of the thermodynamic process to allow the pressure inside the chamber 36 to increase, and thus move a portion of the membrane 32 in a first direction 42. The exhaust valve 38 is opened during another portion of the thermodynamic process to release pressure from inside the chamber to allow the membrane portion to move in a second direction 44. The intake valve 40 is opened during yet another portion of the thermodynamic process to allow more reactants to enter the chamber 36, and thus to begin another cycle of the thermodynamic process.

The membrane 32 may be made of any desired material that is capable of enduring significant pressures and fatigue stresses. For example, in one embodiment the membrane 32 is made of type 304 stainless steel. In addition, the membrane 32 can be designed to have an acoustic impedance that is close to or matches the acoustic impedance of the outside environment that the acoustic signal travels in. When the two impedances match, the membrane 32 efficiently transfers the energy in its vibrations to the outside environment to generate an acoustic signal having a minimal loss in power/intensity relative to the power/intensity of the signal in the membrane 32. Because the membrane's acoustic impedance depends in part on the frequency at which the membrane will vibrate, one may establish a desired frequency in a desired medium for the acoustic signal, and then design the membrane 32 such that the membrane's acoustic impedance for the desired frequency is close to or matches the acoustic impedance of the desired medium at the desired frequency.

Figure 3:
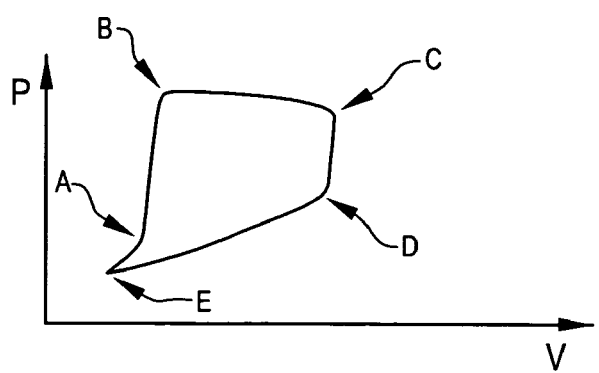
FIG. 3 is a P-V diagram for the thermodynamic process used by the engine in FIG. 2, according to an embodiment of the invention.

FIG. 3 is a P-V diagram for the thermodynamic process that drives the membrane 32, according to an embodiment of the invention. The P-V diagram shows both the pressure inside the chamber 36 and the volume of the mass (the reactants before being combined and the reaction products after their combination) inside the chamber 36 at each moment during a cycle of the thermodynamic process.

Referring to FIGS. 2 and 3, a cycle of the thermodynamic process will now be described beginning with the combination of the reactants in the chamber 36. Beginning the cycle at this moment is arbitrary and only made to facilitate this discussion of the thermodynamic process. The thermodynamic process may begin at any moment during its cycle.

At portion A of the P-V diagram, reactants are in the chamber 36 and are starting to combine in a chemical reaction that produces heat. The exhaust valve 38 and the intake valve 40 are closed. The heat generated by the chemical reaction causes the pressure inside the chamber 36 to increase. Because the pressure increases much faster than the membrane 32 moves in response, the pressure inside the chamber 36 substantially increases while the volume of the mass (reactants and reaction products) inside the chamber does not.

At portion B of the P-V diagram, the pressure inside the chamber 36 is substantially greater than the pressure outside the chamber on the membrane 32. In response to this pressure differential, a portion (here a center portion that spans the chamber 36) of the membrane 32 moves in the first direction 42. For example, the membrane 36 bulges in a direction that increases the volume of the mass inside chamber 36. As the membrane portion moves in the first direction 42, the membrane portion exerts pressure on the outside fluid that is in contact with the membrane 32. This exerted pressure forms a first half (here a high-pressure half) of the acoustic signal 34. In addition, as the membrane portion moves in the first direction, the membrane 32 elastically deforms, which causes the membrane 32 to store energy as tension and compression inside the membrane.

At portion C of the P-V diagram, the membrane portion has reached the extent 46 of its movement in the first direction 42 and the volume of the chamber 36 is at a maximum for this cycle of the thermodynamic process. The pressure inside the chamber 36 is substantially greater than the pressure outside the chamber, but because the membrane 32 has stored a substantial amount of energy as, e.g., tension, inside the membrane, the membrane portion no longer moves. At this moment during the cycle, heat can be removed from inside the chamber 36 to reduce the pressure inside the chamber. As the heat is removed, the pressure decreases, but because the pressure inside the chamber is greater than the pressure outside the chamber, the heat removal does not cause the membrane portion to move in the second direction 44. Thus, as the heat is removed, the volume of the mass inside the chamber 36 remains substantially the same.

At portion D of the P-V diagram, the pressure inside the chamber has reached the level where a further decrease will cause the membrane portion to move in the second direction 44. At this moment the exhaust valve 38 may be opened to allow mass inside the chamber 36 to leave the chamber. This further decreases the pressure inside the chamber 36, and prepares the chamber to receive a fresh amount of one or more reactants to start the next cycle. As the pressure inside the chamber 36 decreases, the membrane portion moves in the second direction 44—i.e., returns toward the position it was in when the heat was initially generated in chamber 36. As the membrane portion moves in the second direction 44, the membrane portion exerts negative pressure on the outside fluid that is in contact with the membrane 32. This exerted pressure forms a second half (here a low-pressure half) of the acoustic signal 34.

At portion E of the P-V diagram, the membrane portion reaches the extent 48 of its movement in the second direction 44, where the volume of the chamber 36 is at its minimum for this cycle of the thermodynamic process. At this moment during the cycle, the exhaust valve 38 may be closed, and the intake valve 40 may be opened to allow a fresh amount of one or more reactants into the chamber 36 to start the next cycle of the thermodynamic process. In an embodiment, the exhaust valve 38 may also be closed at any moment between the portions D and E of the P-V diagram.

The thermodynamic process may drive the membrane 32 to vibrate at any desired frequency. For example, the thermodynamic process may drive the membrane 32 to vibrate at frequency within the range of frequencies 0-100 kHz. In some embodiments, the thermodynamic process may drive the membrane 32 to vibrate at a first-order resonant frequency of the membrane 32 (as discussed in greater detail in conjunction with FIGS. 4A-4D). To do this, the thermodynamic process may be repeated at a frequency that matches the resonant vibration frequency of the membrane 32, or at a frequency that is a fraction of the resonant frequency. For example, the thermodynamic process may act as an impulse that drives the membrane 32 to resonate at a frequency that is greater than the impulse frequency, much like one "pings" a tuning fork to cause the tuning fork to resonate.

In other embodiments, the thermodynamic process may drive the membrane 32 to vibrate at a frequency that is not a resonant frequency of the membrane. For example, the thermodynamic process may drive the membrane 32 to vibrate at a frequency that matches, and is synchronized with, the frequency at which the thermodynamic process repeats in the engine 30.

Still referring to FIGS. 2 and 3, in some embodiments, the engine 30 may include one or more components to modify the resonant frequency of the membrane 32. For example, in some embodiments the engine 30 includes a component to modify the tension in the portion of the membrane 32 that moves in the first and second directions 42 and 44, respectively, (discussed in greater detail in conjunction with FIG. 9). Because the resonant frequencies of the membrane 32 depend in part on the tension in the membrane portion, one may modify the resonant frequencies of the membrane 32 by modifying the tension in the membrane. As another example, in some embodiments the engine 30 includes a component to modify the length or diameter of the membrane portion that moves in the first and second directions 42 and 44 (discussed in greater detail in conjunction with FIG. 11). Because the resonant frequencies of the membrane depend in part on the length of the membrane portion, one may modify the resonant frequencies of the membrane 32 by modifying the length of the membrane portion.

Still referring to FIGS. 2 and 3, in some embodiments of the engine 30, the engine 30 may include one or more components to modify the thermodynamic process for one or more cycles. By modifying the process, one may modify one or more characteristics of the acoustic signal 34 that the engine 30 generates. For example, to modify the frequency of the acoustic signal 34, one may modify the rate that heat is removed from the chamber 36 (see section of P-V diagram between portions C and D). An example of a component to modify the rate of heat removal is discussed in greater detail in conjunction with FIG. 9. By increasing the rate that heat is removed from the chamber 36, one may make the duration of the thermodynamic cycle shorter. As another example, one may modify the frequency of the acoustic wave by modifying the rate that the exhaust valve 38 releases mass from inside the chamber 36 (see section of P-V diagram between portions D and E). By increasing the rate that mass is released from the chamber 36, and thus the rate that pressure is released from the chamber, one may make the duration of the thermodynamic cycle shorter. An example of a component to modify the rate of mass removal is discussed in greater detail in conjunction with FIG. 7. Another example includes changing the moment in the cycle that the reactants start to generate heat in the chamber 36, or any combination of the above three examples. By delaying the moment in the cycle that the reactants are combine to generate heat, one may make the duration of the thermodynamic cycle longer.

In another example, to modify the amplitude of the acoustic signal 34, and thus the amount of energy in the signal, one may modify the acceleration of the membrane 32 portion as it moves in the first direction 42 and/or the second direction 44, the extent of the membrane portion's movement in the first and/or second directions 42 and 44, or any combination of the four. By increasing the acceleration of the membrane portion in the first direction 42, one may increase the pressure generated in the outside fluid, and thus increase the amount of energy in the acoustic signal 34. For example, one may increase the acceleration in the first direction 42, by increasing the pressure inside the chamber 36 that is generated by the heat of the combined reactants. In some embodiments, this can be done by combining a large amount of a reactant. In other embodiments, this may be done by combining reactants that generate a large amount of heat when combined. By increasing the acceleration of the membrane portion in the second direction 44, one may increase the drop in pressure generated in the outside fluid, and thus increase the amount of energy in the acoustic signal. For example, one may increase the drop in pressure inside the chamber 36 by increasing the rate that the pressure is released from inside the chamber 36. In some embodiments this is done by quickly releasing a large amount of mass through the exhaust valve 38. By increasing the extent of the movement in the first direction 42, one may increase the pressure generated in the outside fluid, and thus increase the amount of energy in the acoustic signal 34. By increasing the extent of the movement in the second direction 44, one may increase the drop in pressure generated in the outside fluid, and thus increase the amount of energy in the acoustic signal 34. Further shaping of the waveform is possible, where the exhaust valve might be used numerous times in a sequenced pattern spanning the cycle, or the combustion process may be used numerous times in a sequenced pattern spanning the cycle.

FIGS. 4A-4D each show a cross-sectional view of the membrane 32 of the engine 30 shown in FIG. 2, according to an embodiment of the invention. FIG. 4A shows the membrane 32 not vibrating, and FIGS. 4B-4D each show the membrane 32 vibrating at a resonant frequency, according to an embodiment of the invention.

To reduce the amount of reactant required to generate enough heat to power the thermodynamic process that drives the membrane 32, the engine 30 may drive the membrane 32 at the membrane's resonant frequency. For example, the engine 30 may drive the membrane 32 at the membrane's fundamental frequency (FIG. 3B), which for one embodiment of the membrane is about 2.1 kHz. As another example, the engine 30 may drive the membrane 32 at the membrane's second harmonic frequency (FIG. 3C), which for one embodiment of the membrane is about 4.2 kHz. As another example, the engine 30 may drive the membrane 32 at the membrane's third harmonic frequency (FIG. 3D), which for one embodiment of the membrane is about 6.3 kHz.

FIGS. 5A and 5B each show a perspective view of a device 60 that includes the engine 30 in FIG. 2, according to an embodiment of the invention. The device 60 includes a membrane 62 drivable to generate an acoustic signal having more than one period, in an ocean at a subsurface depth that may range from approximately 50 ft to 1,500 ft. In addition, the device 60 may generate an acoustic signal having an intensity of at least 210 decibels (relative to 1 µPa) 1 meter away from the membrane 62, and may continuously generate such a signal for more than 24 hours. The device 60 also includes a chamber 64 in which reactants (not shown) are combined to generate heat, a tank 66 for storing a reactant before the reactant is used to drive the membrane 62, and a piston 68 to pressurize the reactant inside the tank 66 to facilitate injecting the reactant into the chamber 64. FIG. 5A shows the device 60 with the tank 66 full of reactant—i.e. at the beginning of the device's life span—and FIG. 5B shows the device 60 with the tank 66 half full of the reactant—in the middle of the device's life span.

The device 60 includes a body 70 that may have any desired shape and be made of any desired material that combined allow the body 70 to endure significant pressures and fatigue stresses, and to resist corrosion. For example, in one embodiment the body 70 is made of stainless steel, and has a cylindrical shape that includes a tubular side 72 having a length, and two circular ends 74 and 76, each having a diameter. In this embodiment, the membrane 62 spans the end 76, and the tubular side 72 and the circular end 74 are sufficiently stiff to not vibrate when the thermodynamic process drives the membrane 62. To facilitate the deployment of the device 60 from a conventional A-size deployment system, the length of the tubular side 72 is approximately 36 inches long, and the diameter of each of the ends 74 and 76 is approximately 4⅞ inches long.

Other embodiments of the body 70 are contemplated. For example, the length of the tubular side 72 and the diameter of each of the circular ends 74 and 76 may be configured to allow the device 60 to be deployed from a conventional B-size (6⅞ inch diameter by 60 inch length), C-size (9¾ inch diameter by 60 inch length), D-size (3 inch diameter by 15 inch length), F-size (4⅞ inch diameter by 12 inch length), or G-size (4⅞ inch diameter by 16½ inch length) deployment system.

Still referring to FIGS. 5A and 5B, the membrane 62 may be any desired shape and made of any desired material that combined allow the membrane 62 to endure significant pressures and fatigue stresses, and to resist corrosion. For example, in one embodiment, the membrane 62 is made from 304 stainless steel, has a diameter of about 4.8 inches and a thickness of about 0.125 inches. In addition, the acoustic impedance of the membrane 62 for a predetermined frequency may approximate the acoustic impedance of saltwater at the same frequency to maximize the transfer of the signal's power/intensity from the membrane 62 to the saltwater.

Figure 6:
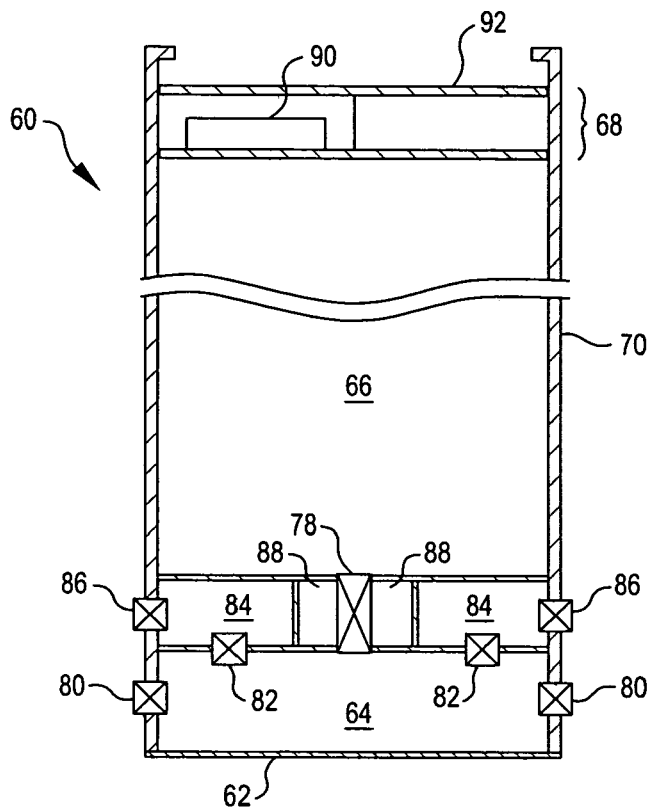
FIG. 6 is a cross-sectional view of the device in FIG. 5A.

FIG. 6 is a cross-sectional view of the device 60 in FIG. 5A. In this embodiment, sodium and water are the reactants that are combined in the chamber 64 to generate heat inside the chamber, and thus pressure inside the chamber to move the membrane 62. When the device 60 is positioned at a depth of about 1,500 ft, about 4.0 grams of sodium may be combined with about 10.5 grams of saltwater to generate an acoustic signal having a frequency of about 2.1 kHz and an intensity of 210 dB 1 meter away. For a body 70 designed to be deployed from a conventional, Naval, A-size deployment system, the tank 66 may hold 3 kilograms when full, and thus generate about 750 cycles of the thermodynamic process. If the device 60 is positioned in shallower water, then the device may consume less sodium per cycle of the thermodynamic process than the amount consumed at a depth of 1,500 feet because the pressure that the water exerts on the outside of the membrane 62 is less at 50 ft than it is at 1,500 ft. Thus, in shallower water the device 60 may be able to generate more than 750 cycles of the thermodynamic process.

In this embodiment, the device 60 includes a sodium intake valve 78 that, when open, allows sodium (not shown) stored in the tank 66 to enter the chamber 64, and a water intake valve 80 (here two) that, when open, allows water from the outside ambient environment to enter the chamber 64. The device 60 also includes a chamber exhaust valve 82 (here two) that, when open, allows the products of the sodium-water chemical reaction to leave the chamber 64 and enter the plenum 84, and a plenum exhaust valve 86 that, when open, allows the contents in the plenum 84 to leave the plenum and enter the outside ambient environment. The device 60 also includes a heater 88 that takes some of the heat in the products of the chemical reaction to melt the sodium adjacent the valve 78 to facilitate the flow of sodium through the valve 78. The device 60 also includes the piston 68 to exert pressure on the sodium inside the tank 66 to also facilitate the flow of sodium through the valve 78. Inside the piston 68, circuitry 90 is disposed that controls one or more of the valves 78, 80, 82, and 86 to control the operation of the thermodynamic process that drives the membrane to generate an acoustic signal. In other embodiments, the circuitry 90 may be on top of the piston 68. The piston 68 is urged to move toward the valve 78 by the water pressure exerted on the surface 92. In other embodiments, the piston 68 may be coupled to a battery-powered motor that is controlled by the circuitry 90 and that urges the piston 68 toward the valve 78.

The membrane 62 may be driven by the thermodynamic process discussed in conjunction with FIG. 3. For example, in operation, when the sodium and water are to be injected into the chamber 64, the sodium intake valve 78 and the water intake valve 80 are opened. Because of the pressure inside tank 66, sodium flows through the valve 78 into the chamber 64, and because of the water pressure in the outside ambient environment, water flows through valves 80 into the chamber 64. After the desired amount of sodium and water are in the chamber 64, the valves 78 and 80 are closed. The sodium and water chemically react, which generates heat. Because all of the valves 78, 80, and 82 are closed at this moment in the cycle, the pressure inside the chamber 64 increases and eventually moves the membrane 62 away from the valve 78. After the membrane 62 has reached its maximum displacement, heat is removed from the chamber 64 into the cooler water outside of the device 60. After a sufficient amount of heat has been removed, the chamber exhaust valves 82 and plenum exhaust valves are opened, and the reaction products of the sodium-water reaction flow through valves 82 into the plenum 84. As the reaction products flow into the plenum 84, the reaction products force the previous cycle's reaction products to flow through the valves 86 into the water outside the device 60. Before all of the current cycle's reaction products can flow through the valves 86, the valves 86 are closed, and reaction products remain inside the plenum where the heater 88 absorbs some the reaction products' heat. Next, the chamber exhaust valves 82 are closed, and the intake valves 78 and 80 are opened to begin the next cycle of the thermodynamic process.

Figure 7:
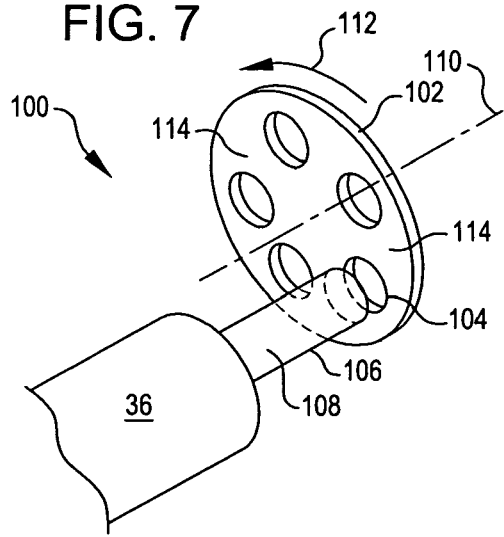
FIG. 7 is a view of an exhaust valve that the engine in FIG. 2 may include, according to yet another embodiment of the invention.

FIG. 7 is a view of an exhaust valve 100 that the engine 30 in FIG. 2 may include, according to yet another embodiment of the invention. The exhaust valve 100 may be included in the device 60 (FIGS. 5A, 5B, 6), the device 232 (FIG. 13), and the engines 130 (FIG. 9), 160 (FIG. 10), 190 (FIG. 11), and 210 (FIG. 12). The exhaust valve 100 allows one to modify the rate at which the reaction products leave the chamber 36, and thus modify the rate at which pressure is released from inside the chamber 36. As discussed elsewhere herein, by modifying the rate at which pressure is released from the chamber 36, one may modify the frequency of the acoustic wave generated by the engine 30 (FIG. 2). When the pressure is released slowly, the frequency of the acoustic signal may be low, and when the pressure is released quickly, the frequency of the acoustic signal may be higher.

The exhaust valve 100 includes a disk 102 that spins to regulate the reaction products' flow rate out of the chamber 36. For example, in one embodiment the disk 102 includes one or more holes 104 (five here), and a conduit 106 having a passage 108 that couples the chamber 36 with the disk 102. The disk 102 rotates about an axis 110 in the direction of the arrow 112, and the holes 104 are located in the disk 102 such that as the disk 102 spins about the axis 110, each of the holes 104 is aligned with the passage 108 at a respective moment during the disk's rotation. As each hole 104 passes by the passage 108, the exhaust valve 100 is open, and the reaction products in the chamber 36 may flow through the passage 108 and the respective hole 104 to leave the chamber 36. As the portion 114 of the disk 102 passes by the passage 108, the exhaust valve 100 closes, and the heat generated by the chemical reaction between the reactants in the chamber 36 generates pressure inside the chamber 36.

The flow rate of the reaction products through the exhaust valve 100 depend in part on the rotational speed of the disk 102, the number of holes 104 in the disk 102, and the spacing between each adjacent pair of holes. In this embodiment, the spacing between each adjacent pair of holes is the same. Thus for each revolution of the disk 102, the thermodynamic process may cycle through 5 cycles. As the rotational speed of the disk increases, the length of time between each adjacent pair of holes 104 decreases. Consequently, the duration of the corresponding thermodynamic cycle decreases, which may cause the frequency of the acoustic signal to increase.

Other embodiments are contemplated. For example, one or more of the holes 104 may be a curved slot (e.g. two adjacent holes close enough to each to form a slot in stead of two separate holes) to allow more mass to flow out of the chamber 36 for a desired duration of the valve's opening. This causes the pressure inside the chamber 36 to decrease at a faster rate that the valve 100 allows. Thus, the acceleration of the membrane 32 (FIG. 2) from its maximum outward displacement toward its maximum inward displacement may increase to modify the power/intensity of the acoustic signal. In another example, the spacing between each pair of adjacent holes 104 is not the same, and the opening of the exhaust valve 100 in a cycle of the thermodynamic process may include two or more of the holes 104 passing by the passage 108.

Figure 8:
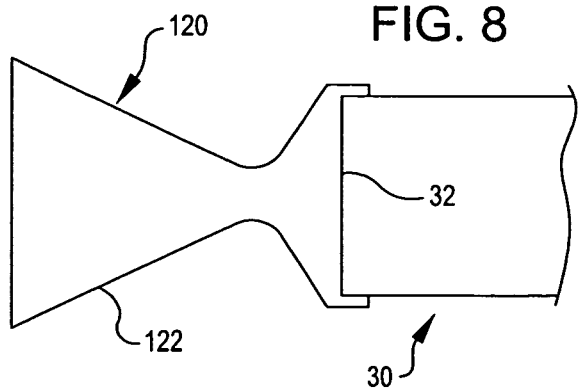
FIG. 8 is a cross-sectional view of a horn mounted to the engine in FIG. 2, according to still another embodiment of the invention.

FIG. 8 is a cross-sectional view of a horn 120 mounted to the engine 30 in FIG. 2, according to still another embodiment of the invention. The horn 120 may be included in the device 60 (FIGS. 5A, 5B, 6), the device 232 (FIG. 13), and the engines 130 (FIG. 9), 160 (FIG. 10), 190 (FIG. 11), and 210 (FIG. 12). The horn 120 focuses the acoustic signal generated by the engine 30. By focusing the signal, one may concentrate the signal into a beam having desired characteristics, and one may direct the signal in a desired direction relative to the engine 30.

The horn 120 may have any desired configuration that may focus the acoustic signal generated by the engine 30. For example, in one embodiment the horn 120 is releasably mounted to the portion of the engine 30 adjacent the membrane 32 and includes a body 122 configured to focus certain desired frequencies.

Figure 12:
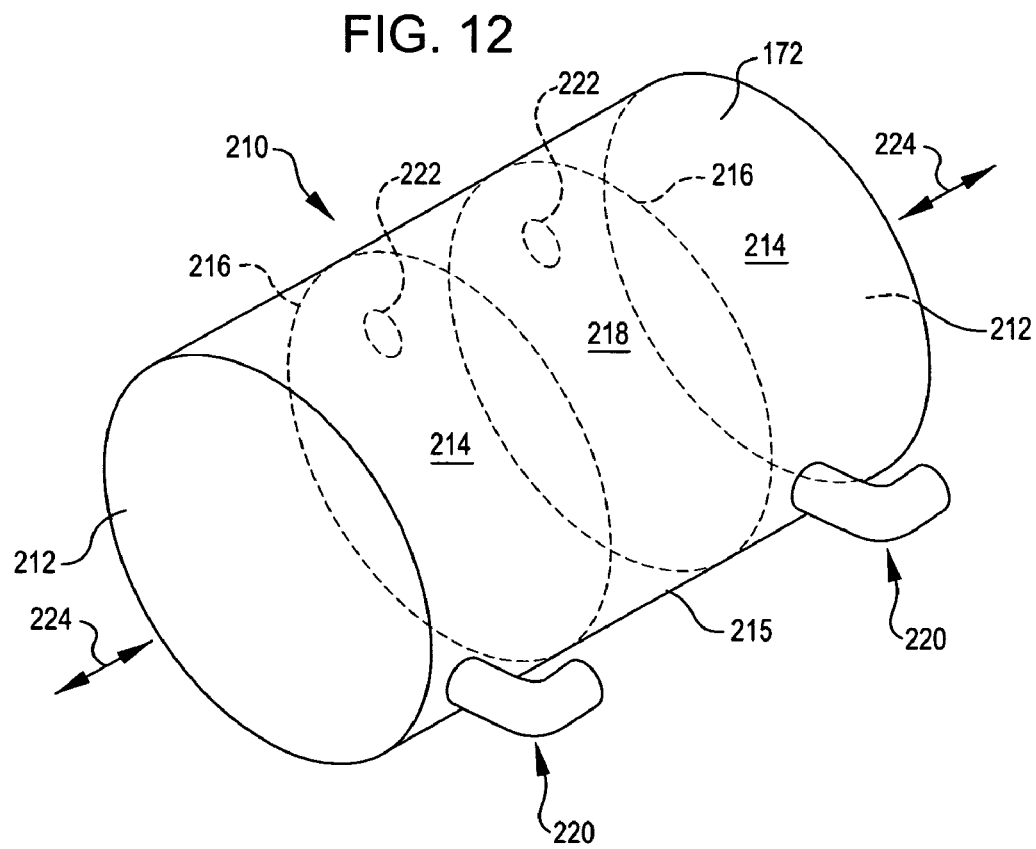
FIG. 12 is a perspective view of an engine, according to yet another embodiment of the invention.
Figure 13:
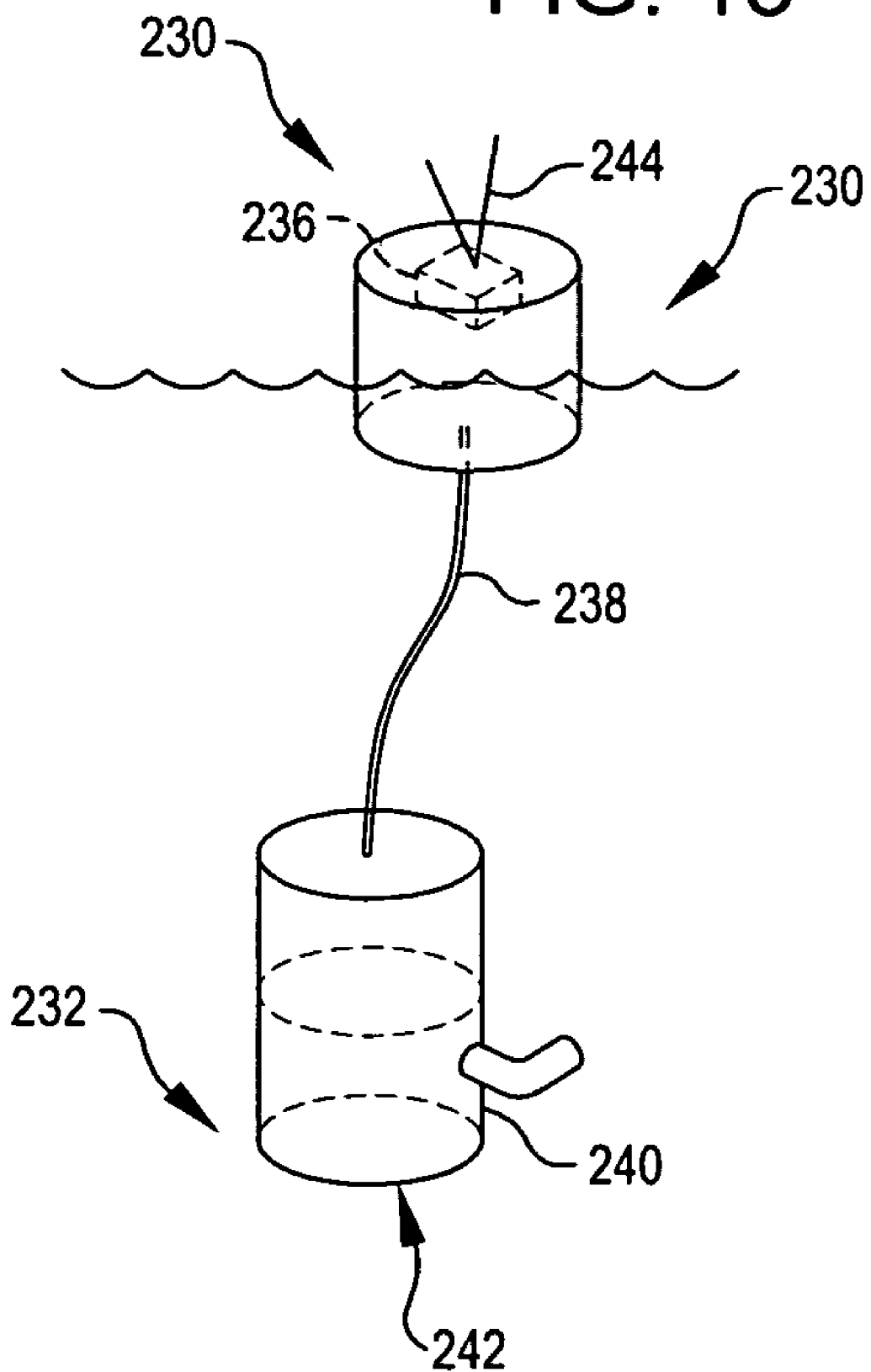
FIG. 13 is a perspective view of a system that includes an engine, according to an embodiment of the invention.

FIG. 9 is a cross-sectional view of an engine 130, according to another embodiment of the invention. The engine 130 is similar to the engine 30 (FIG. 2) except the engine 130 includes a tension component 132 for changing the tension in the membrane 134, a cooling component 136 for isolating the membrane 134 from the heat generated during the thermodynamic process, a generator 138 for converting energy in the hot exhaust gases into electricity, and an ignition component 139 for igniting the reactants. In other embodiments, the engine 130 may have any one of these components 132, 136, 138, and 139 alone, or any combination of two or more of the components 132, 136, 138, and 139. One or more of these components 132, 136, 138, and 139 alone, or any combination of two or more of the components 132, 136, 138, and 139 may be included in the device 60 (FIGS. 5A, 5B, and 6), the device 232 (FIG. 13), and the engines 130 (FIG. 9), 160 (FIG. 10), 190 (FIG. 11), and 210 (FIG. 12). In addition, the engine 130 may be used by the device 60 (FIGS. 5A, 5B, and 6), and the device 232 (FIG. 13).

As discussed elsewhere herein, the resonant frequency or frequencies of an engine's membrane depend in part on the tension in the membrane. Thus, one may modify the resonant frequency of the membrane 134 by changing the tension in the membrane with a tension component. The tension component 132 may be any desired component that performs this function. For example, in one embodiment, the tension component 132 includes a first end 140 mounted to the membrane 134, a second end 142 mounted to the body 144, and a threaded rod 146 (here two) that is rotatably coupled to the first end 140 and threadingly coupled to the second end 142. To adjust the tension in the membrane 134, one turns the rod 146 relative to the second end 142. As the rod 146 turns, the threads in the second end 142 exert pressure on the rod's threads, and, depending on which direction the rod 146 is turned, the second end's threads try to move the rod 146 toward or away from the membrane 134. If the second end's threads try to move the rod 146 away from the membrane 134, the rod will pull on the membrane and increase tension in the membrane. If the second end's threads try to move the rod 146 toward the membrane 134, the rod will push on the membrane and decrease tension in the membrane.

Other embodiments of the tension component 132 are contemplated. For example, the tension component 132 may be configured to exert radial pressure on the portion of body 144 that the membrane 134 is mounted to. Radial pressure is pressure in a radial direction relative to the end of body 144, which tries to enlarge the opening of the body 144 that the membrane 134 spans. In another example, the tension component 132 may include an electric motor to turn one or more of the rods 146.

The cooling component 136 isolates the membrane 134 from the heat generated during the thermodynamic process to prevent damage to the membrane. The cooling component 136 may also remove heat from the chamber 148, and may thus be used to modify the thermodynamic process to modify the acoustic signal generated by the engine 130. The cooling component 136 may be any desired component. For example, in one embodiment the cooling component 136 may include a heat exchanger 150 disposed inside the chamber 148 and along the membrane 134. The heat exchanger 150 absorbs the excess heat generated by combining the reactants during the thermodynamic process, and transfers this heat to the outside environment via the body 144. By locating the heat exchanger 150 near the membrane 134, the heat exchanger 150 keeps the membranes at a suitably cool temperature. Because the membrane 134 may be thinner than the engine's body 144, and thus more vulnerable to heat than the body 144, the heat exchanger 150 may help prevent heat damage to the membrane 134.

Other embodiments are contemplated. For example, the cooling component 136 may include an additional heat exchanger located near the heat exchanger 150 to provide more heat removal capacity and/or quicker heat removal. In another example, the cooling component 136 may include a thermo-electric ring for generating electricity from the heat removed from the chamber 148. In still other embodiments other heat removal techniques can be used.

Still referring to FIG. 9, the engine 130 includes a generator 138 to convert energy in the hot reaction products into electrical power. The generator 138 may be any desired generator. For example, the generator 138 can include a turbine (not shown) that rotates as the reaction products flow by the turbine's blades, and a magnet (not shown) that is surrounded by a winding of wires, and that rotates relative to the winding to generate electricity when the turbine rotates. The generator 138 may be coupled to a battery to store the electricity that the generator 138 generates. In still other embodiments the electricity generated by the generator 138 can be used to power a refrigeration or heat-pump cycle (such as the thermo-electric ring) that can help remove heat from one or more components of the engine 130, such as the membrane 134 and/or body 144. This may be desirable to help prevent heat damage to the one or more components. This may also allow one to shorten the duration of a cycle of the thermodynamic process discussed in conjunction with FIGS. 2 and 3, and thus, allow one to increase the frequency of the acoustic signal generated by the engine 130.

Still referring to FIG. 9, the engine 130 includes an ignition component 139 to ignite the reactants inside the chamber 148. For example, in one embodiment the ignition component 139 includes a spark plug (not shown) that generates a spark when a voltage is applied across the plug's gap (not shown). The application of the voltage can be controlled by a controller, such as the circuitry 90 in FIG. 6, and can be modified as desired to change the timing of the chemical reaction inside the chamber 148 within a cycle of the thermodynamic process.

Other embodiments are contemplated. For example the ignition component 139 may be a glow plug similar to a glow plug used to initiate combustion in a diesel engine.

FIG. 10 is a perspective view of an engine 160, according to yet another embodiment of the invention. The engine 160 can be used by the device 60 (FIGS. 5A, 5B and 6), and the device 232 (FIG. 13), and can include one or more of the components discussed in conjunction with FIG. 6. The engine 160 is similar to the engine 30 (FIG. 2) except the engine 160 includes a body 162 that has a tubular side 164 that includes a membrane 166 for generating an acoustic signal. In some embodiments the membrane 166 wraps around the chamber 168, and in other embodiments the membrane 166 only extends across a portion of the side 164, such as a quarter of the way or halfway around the chamber 168. By having the membrane 166 form a part of the engine's tubular side 164, the engine 160 may direct the acoustic signal in a broader range of directions.

The body 162 has a wall 170 that separates the chamber 168 from a section 172 of the body, in which reactants may be stored, an exhaust valve 174 for opening and closing the chamber 168 to the environment outside the engine 160, and an intake port 176 that is opened and closed at a determined time during the thermodynamic process to allow reactants to enter the chamber 168. When the thermodynamic process drives the membrane 166 to vibrate, the membrane 166 vibrates in the directions represented by the arrow 178. The position 180 represents the position of the membrane 166 at its maximum displacement in the first direction, and the position 182 represents the position of the membrane 166 at its maximum displacement in the second direction. Furthermore, similar to the membrane 32 (FIG. 2) of the engine 30, the membrane 166 has a resonant frequency at which the engine 160 may drive the membrane to vibrate.

Figure 11:
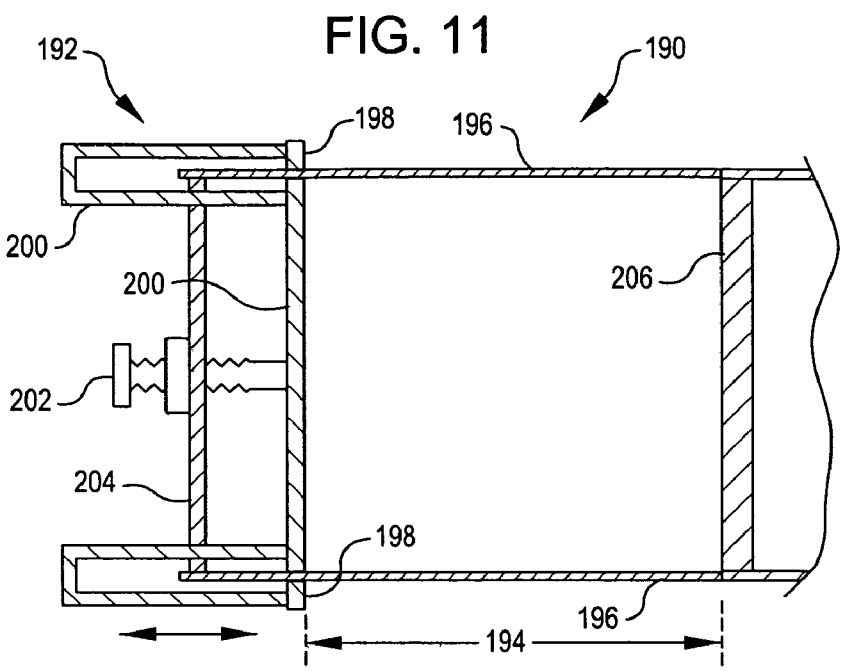
FIG. 11 is a cross-sectional view of an engine, according to another embodiment of the invention.

FIG. 11 is a cross-sectional view of an engine 190, according to another embodiment of the invention. The engine 190 can be used by the device 60 (FIGS. 5A, 5B and 6), and the device 232 (FIG. 13), and can include one or more of the components discussed in conjunction with FIG. 6. The engine 190 is similar to the engine 160 (FIG. 10) except the engine 190 includes a sleeve 192 for changing the length 194 of the membrane 196.

As discussed elsewhere herein, the resonant frequency or frequencies of an engine's membrane depend in part on the length of the membrane. Thus, one may modify the resonant frequency of the membrane 196 by changing the length of the membrane's portion that vibrates. The sleeve 192 may be any desired sleeve capable of holding the membrane 196 at a desired location and preventing a portion of the membrane adjacent the location from vibrating. For example, in one embodiment the sleeve 192 includes a pincer 198 that pinches the membrane 196 at the desired location, a carrier 200 that holds the pincer 198, and a threaded rod 202 that is rotatably coupled to the carrier 200 and threadingly coupled to the body 204. To move the pincer 198 relative to the membrane 196, and thus allow the pincer 198 to pinch the membrane 196 at a desired location, one turns the rod 202 relative to the body 204. As the rod 202 turns, the threads in the body 204 exert pressure on the rod's threads and depending on which direction the rod 202 is turned, the rod 202 will move toward or away from the membrane wall 206 of the body 204. If the rod 202 moves away from the wall 206, the rod will move the pincer 198 away from the wall 206, and thus increase the length of the membrane 196. If the rod 202 moves toward the wall 206, the rod will move the pincer 198 toward the wall, and thus decrease the length of the membrane 196.

FIG. 12 is a perspective view of an engine 210, according to yet another embodiment of the invention. The engine 210 can be used by the device 60 (FIGS. 5A, 5B and 6), the device 232 (FIG. 13), and can include one or more of the components discussed in conjunction with FIG. 6. The engine 210 is similar to the engine 30 (FIG. 2) except that the engine 210 includes a membrane 212 at each end of the body 214. In some embodiments both membranes 212 generate an acoustic signal having the same or substantially the same characteristics, such as frequency and intensity. In other embodiments, each membrane 212 generates a respective acoustic signal that is different than the acoustic signal generated by the other membrane 212. By having two membranes 212, each generating an acoustic signal, one may generate an acoustic signal in stereo, and thus add acoustic depth to the region of the environment in which the signals travel. This may be desired to mimic an acoustic footprint of a vessel.

In all embodiments, the engine 210 includes two chambers 214 each corresponding to a respective membrane 212. The body 215 has two walls 216 each separating a respective chamber 214 from a section 218 of the body 215. The engine 210 also includes two exhaust valves 220, each corresponding to a respective chamber 214, for opening and closing the chambers to the environment outside the engine 210, and two intake ports 222, each corresponding to a respective chamber 214, that are opened and closed at a determined time during a cycle of the thermodynamic process to allow reactants into the chambers 214. When the thermodynamic process drives the membranes 212 to vibrate, the membranes 212 vibrate in the directions represented by the arrows 224.

Other embodiments are contemplated. For example, a single chamber 214 may correspond to both membranes 212. In this example, the thermodynamic process that proceeds in the single chamber 214 drives both membranes 212. In another example, one membrane 212 may be located at an end of the body 215 and the other membrane 212 may be located at a side of the body 215 as in FIG. 10. In yet another example, each of the membranes 212 may have the same resonant frequencies and vibrate at one of those frequencies.

FIG. 13 is a perspective view of a system 230, according to an embodiment of the invention. The system 230 includes a device 232 to generate an acoustic signal in a fluid (here water in an ocean), and a buoy 234 that includes communication circuitry 236 to send signals to and receive signals from a station such as a look-out station located on land, or a vessel, such as a ship, airplane, or satellite. The system 230 also includes a tether 238 to couple the device 232 to the buoy 234. Together, the buoy 234 and tether 238 can suspend the device in the fluid at any desired depth. The device 232 includes an engine 240 that generates the acoustic signal by vibrating a membrane 242 via the thermodynamic process discussed in conjunction with FIGS. 2 and 3. The engine 240 can be any of the engines 130 (FIG. 9), 160 (FIG. 10), 190 (FIG. 11), and 210 (FIG. 12). The communication circuitry includes an antenna 244 for sending and receiving signals. The signals may include a command to modify aspects of the engine 240 such as the tension of the engine's membrane 242 or aspects of the thermodynamic process such as the moment in the process when the reactants are combined to generate heat, and thus pressure. The signals may also include information about an object in the region of the device 232 that reflects the generated acoustic signal. Such signals may be sensed by sensors (not shown) included in the device 232 or the buoy 234, and then relayed to the communication circuitry 236 for sending to a station. The signals may also include a command to turn the engine on, off, or run in pulse mode to conserve the reactants.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What we claim is:

1. An engine for generating an acoustic signal, the engine comprising:
   a chamber operable to contain a spontaneous chemical reaction that generates heat, wherein while the chemical reaction occurs the pressure inside the chamber increases;
   a valve operable to open the chamber to release mass from inside the chamber to decrease pressure inside the chamber, and operable to close the chamber to cause the heat from the chemical reaction to generate pressure inside the chamber;
   a membrane having a portion that is operable to move in response to a pressure change inside the chamber, wherein the portion moves in a first direction while the pressure inside the chamber increases, and the portion moves in a second direction while the pressure inside the chamber decreases; and
   wherein the increase and decrease of pressure inside the chamber can be repeated by the engine to vibrate the membrane portion in the first and the second directions to generate an acoustic signal having more than one period.

2. The engine of claim 1 wherein the acoustic signal includes a pressure wave.

3. The engine of claim 1 wherein the acoustic signal has a frequency between approximately 0 and 100 kHz.

4. The engine of claim 1 wherein the engine includes a cylindrical body in which the chamber is disposed, the cylindrical body having a tubular side that includes the membrane.

5. The engine of claim 1 wherein the engine includes a cylindrical body in which the chamber is disposed, the cylindrical body having a circular end that includes the membrane.

6. The engine of claim 1 wherein the engine includes:
   two membranes that vibrate to generate a respective acoustic signal, and
   a cylindrical body in which the chamber is disposed, the cylindrical body having two circular ends, wherein each end includes a respective one of the membranes.

7. The engine of claim 6 wherein the respective acoustic signals are the same.

8. The engine of claim 6 wherein the respective acoustic signals are different.

9. The engine of claim 1 wherein:
   the membrane has a resonant frequency, and
   while the engine repeats the thermodynamic process the membrane vibrates at the resonant frequency.

10. The engine of claim 9 wherein the resonant frequency comprises the fundamental frequency of the membrane.

11. The engine of claim 9 wherein the resonant frequency comprises a harmonic frequency that is not the fundamental frequency of the membrane.

12. The engine of claim 1:
   wherein the membrane has a resonant frequency, and
   further comprising a component operable to modify tension in the membrane to modify the resonant frequency.

13. The engine of claim 12 wherein:
   the engine includes a cylindrical body in which the chamber is disposed, the cylindrical body having a tubular side, and a circular end that the membrane spans, and
   the component is operable to exert pressure on the membrane relative to the tubular side to modify the tension in the membrane.

14. The engine of claim 1:
   wherein the membrane has a resonant frequency, and the membrane portion has a length, and
   further comprising a component operable to modify the length of the membrane portion to modify the resonant frequency of the membrane.

15. The engine of claim 14 wherein:
the engine includes a cylindrical body in which the chamber is disposed, the cylindrical body having a first circular end, a second circular end, and a tubular side that extends between the first and second ends and that includes the membrane portion, and
the component includes a sleeve mounted to the second circular end and operable to hold an end of the membrane at different membrane locations to modify the length of the membrane portion.

16. The engine of claim 1 operable to modify the rate at which the pressure inside the chamber is released from inside the chamber to modify the periods of the acoustic signal.

17. The engine of claim 16 further comprising an intake valve that is operable to introduce a reactant into the chamber, and to modify the rate at which the reactant is introduced into the chamber to modify the periods of the acoustic signal.

18. An engine for generating an acoustic signal, the engine comprising:
a liquid-tight chamber operable to contain a chemical reaction that generates heat, wherein while the chemical reaction occurs the pressure inside the chamber increases;
a valve operable to open the chamber to release mass from inside the chamber to decrease pressure inside the chamber, and operable to close the chamber to cause the heat from the chemical reaction to generate pressure inside the chamber;
a membrane having a portion that is operable to move in response to a pressure change inside the chamber, wherein the portion moves in a first direction while the pressure inside the chamber increases, and the portion moves in a second direction while the pressure inside the chamber decreases;
wherein the increase and decrease of pressure inside the chamber can be repeated by the engine to vibrate the membrane portion in the first and the second directions to generate an acoustic signal having more than one period; and
an ignition component operable to start the chemical reaction, and to modify when the chemical reaction starts in the thermodynamic process to modify the periods of the acoustic signal.

19. The engine of claim 1 further comprising a component operable to generate electric power from the pressure released from inside the chamber.

20. The engine of claim 1 further comprising a cooling component operable to remove heat from inside the chamber.

21. The engine of claim 1 further comprising a thermoelectric ring coupled to the cooling components and operable to generate electricity from the heat removed from inside the chamber.

22. The engine of claim 1 further comprising a horn operable to focus the acoustic signal.

23. A method for generating an acoustic signal, the method comprising:
vibrating a membrane of an engine by repeating a thermodynamic process in the engine, wherein the thermodynamic process includes:
combining reactants inside a chamber of the engine;
allowing the reactants to spontaneously react to generate heat inside the chamber;
generating pressure inside the chamber from the generated heat;
in response to generating the pressure, moving in a first direction a portion of a membrane of the engine;
removing mass from inside the chamber to decrease the pressure inside the chamber; and
in response to decreasing the pressure inside the chamber, moving the membrane portion in a second direction.

24. The method of claim 23 wherein the membrane vibrates at a frequency and the thermodynamic process repeats at a frequency that is the same or substantially the same as the membrane's vibration frequency.

25. The method of claim 23 wherein the membrane vibrates at one of its resonant frequencies, and the thermodynamic process repeats at a frequency that is half or substantially half of the membrane's vibration frequency.

26. A method for generating an acoustic signal, the method comprising:
vibrating a membrane of an engine by repeating a thermodynamic process in the engine, wherein the thermodynamic process includes:
combining reactants inside a chamber of the engine to generate heat inside the chamber;
generating pressure inside the chamber from the generated heat;
in response to generating the pressure, moving in a first direction a portion of a membrane of the engine;
removing mass from inside the chamber to decrease the pressure inside the chamber;
in response to decreasing the pressure inside the chamber, moving the membrane portion in a second direction; and
wherein the membrane vibrates at its fundamental frequency and the thermodynamic process repeats at a frequency that is half or substantially half of the membrane's fundamental frequency.

27. A method for generating an acoustic signal, the method comprising:
vibrating a membrane of an engine by repeating a thermodynamic process in the engine, wherein the thermodynamic process includes:
combining reactants inside a chamber of the engine to generate heat inside the chamber;
generating pressure inside the chamber from the generated heat;
in response to generating the pressure, moving in a first direction a portion of a membrane of the engine;
removing mass from inside the chamber to decrease the pressure inside the chamber;
in response to decreasing the pressure inside the chamber, moving the membrane portion in a second direction; and
changing the tension in the membrane to modify a resonant frequency of the membrane.

28. A method for generating an acoustic signal, the method comprising:
vibrating a membrane of an engine by repeating a thermodynamic process in the engine, wherein the thermodynamic process includes:
combining reactants inside a chamber of the engine to generate heat inside the chamber;
generating pressure inside the chamber from the generated heat;
in response to generating the pressure, moving in a first direction a portion of a membrane of the engine;
removing mass from inside the chamber to decrease the pressure inside the chamber;
in response to decreasing the pressure inside the chamber, moving the membrane portion in a second direction; and
changing a length of the membrane portion to modify a resonant frequency of the membrane.

29. A method for generating an acoustic signal, the method comprising:
vibrating a membrane of an engine by repeating a thermodynamic process in the engine, wherein the thermodynamic process includes:
combining reactants inside a chamber of the engine to generate heat inside the chamber;
generating pressure inside the chamber from the generated heat;
in response to generating the pressure, moving in a first direction a portion of a membrane of the engine;
removing mass from inside the chamber to decrease the pressure inside the chamber;
in response to decreasing the pressure inside the chamber, moving the membrane portion in a second direction; and
changing the moment in the thermodynamic process when the reactants are combined, to modify the membrane's vibration frequency.

30. A method for generating an acoustic signal, the method comprising:
vibrating a membrane of an engine by repeating a thermodynamic process in the engine, wherein the thermodynamic process includes:
combining reactants inside a chamber of the engine to generate heat inside the chamber;
generating pressure inside the chamber from the generated heat;
in response to generating the pressure, moving in a first direction a portion of a membrane of the engine;
removing mass from inside the chamber to decrease the pressure inside the chamber;
in response to decreasing the pressure inside the chamber, moving the membrane portion in a second direction;
wherein generating heat inside the chamber includes igniting the reactants in the chamber; and
changing the moment in the thermodynamic process when the reactants are ignited, to modify the membrane's vibration frequency.

31. A method for generating an acoustic signal, the method comprising:
vibrating a membrane of an engine by repeating a thermodynamic process in the engine, wherein the thermodynamic process includes:
combining reactants inside a chamber of the engine to generate heat inside the chamber;
generating pressure inside the chamber from the generated heat;
in response to generating the pressure, moving in a first direction a portion of a membrane of the engine;
removing mass from inside the chamber to decrease the pressure inside the chamber;
in response to decreasing the pressure inside the chamber, moving the membrane portion in a second direction; and
modifying the rate at which pressure is released from inside the chamber to modify the membrane's vibration frequency.

32. The method of claim 23 further comprising focusing the acoustic signal.

33. A system, comprising:
a buoy operable to float in a fluid; and
an engine coupled to the buoy and operable to generate an acoustic signal having more than one period, the engine including:
a chamber operable to contain a chemical reaction that generates heat, wherein while the chemical reaction occurs the pressure inside the chamber increases;
an exhaust valve operable to open the chamber to release mass from inside the chamber to decrease pressure inside the chamber, and operable to close the chamber to cause the heat from the chemical reaction to generate pressure inside the chamber;
a membrane having a portion that is operable to move in response to a pressure change inside the chamber, wherein the portion moves in a first direction while the pressure inside the chamber increases, and the portion moves in a second direction while the pressure inside the chamber decreases; and
wherein the increase and decrease of pressure inside the chamber can be repeated by the engine to vibrate the membrane portion in the first and the second directions to generate an acoustic signal having more than one period.

34. The system of claim 33 wherein the buoy includes circuitry operable to transmit information to a remote location relative to the location of the system.

35. The system of claim 33 wherein the engine is operable to generate the acoustic signal when positioned in a fluid at any depth down to and including approximately 1,500 ft.

36. The system of claim 33 wherein the engine is operable to generate the acoustic signal when positioned in a fluid at a depth of 50 ft.

37. The system of claim 33 wherein the acoustic signal mimics the acoustic signal of a vessel traveling through a fluid.

38. The system of claim 33 wherein the engine is operable to generate the acoustic signal for more than 15 minutes.

39. The system of claim 33 further comprising a tether that couples the engine with the buoy.

* * * * *